July 18, 1967

M. L. HOCH 3,331,167

KNIFE SHARPENING DEVICE

Filed March 8, 1965

Inventor:
Manfried L. Hoch
By John J. Romaine
Atty.

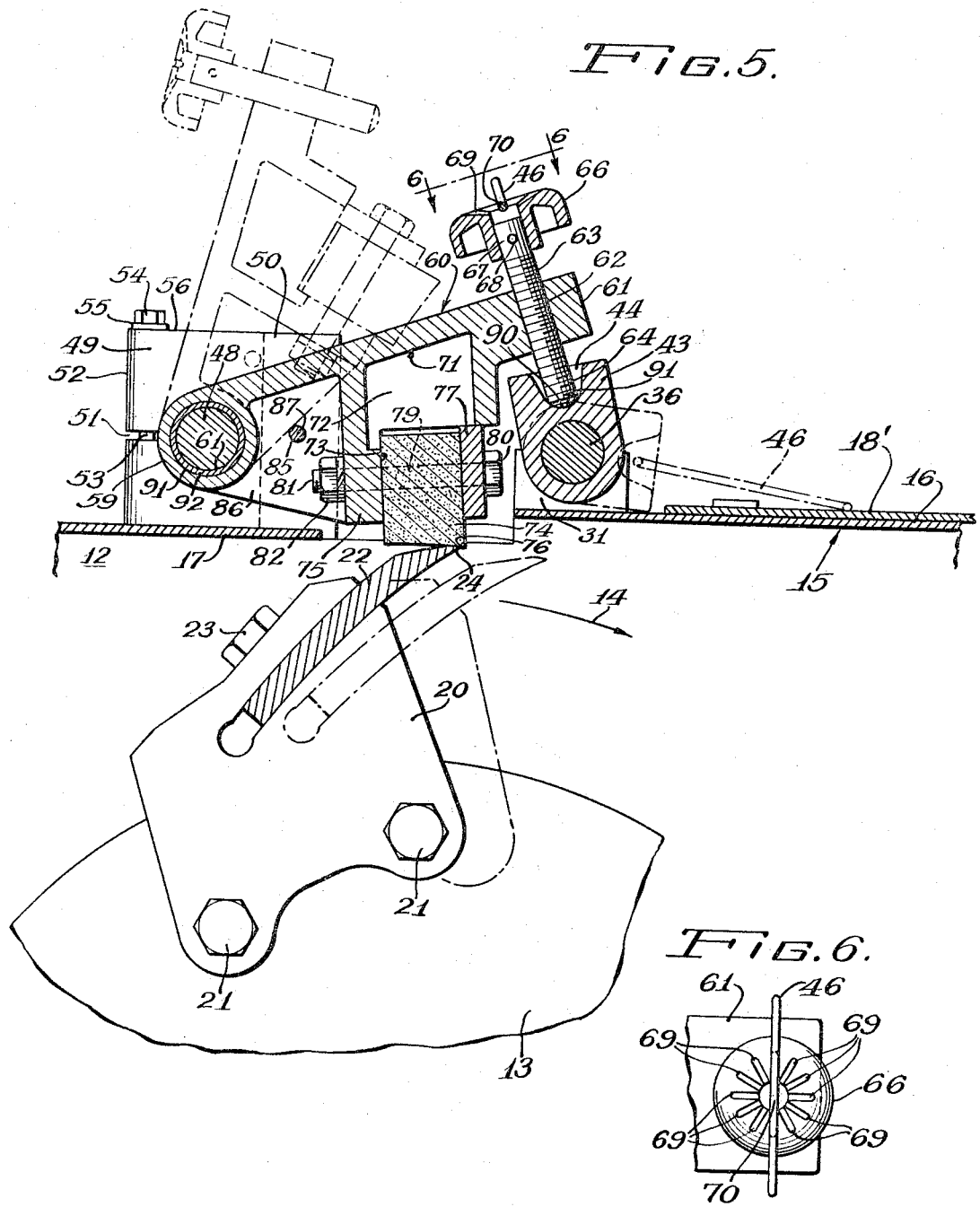

July 18, 1967
M. L. HOCH
3,331,167
KNIFE SHARPENING DEVICE
Filed March 8, 1965
3 Sheets-Sheet 3
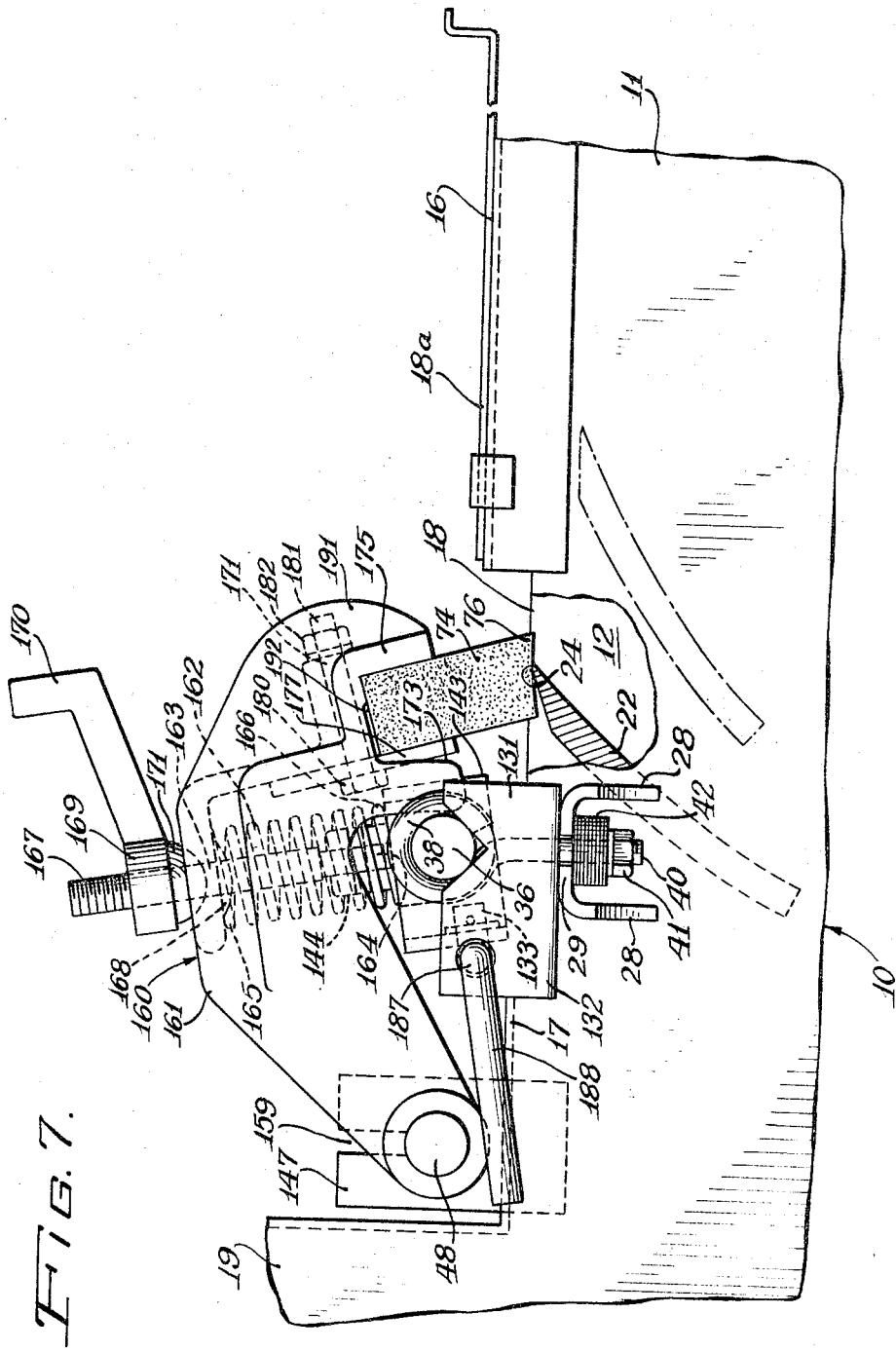
Inventor:
Manfried L. Hoch
By John J. Komarik
Atty.

United States Patent Office

3,331,167
Patented July 18, 1967

3,331,167
KNIFE SHARPENING DEVICE
Manfried L. Hoch, Lockport, Ill., assignor to International Harvester Company, Chicago, Ill., a corporation of New Jersey
Filed Mar. 8, 1965, Ser. No. 437,946
20 Claims. (Cl. 51—246)

The instant invention relates to knife sharpening devices. Particularly, the invention relates to a sharpening device adapted for a cutting edge of a rotatable cutter carried within a cutter housing. Specifically the invention relates to a sharpener adapted for knives and the like carried on a cutter head rotatable in a cylinder into which forage crops are fed in a forage harvesting device.

A conventional forage harvesting device may have a crop gathering head from which crop is delivered into a feeding mechanism comprising opposed roller means, the upper of which comprises what is commonly referred to as a feed apron and the lower of which is referred to as a feed roller assembly. The feeding mechanism feeds the gathered crop into a cutter or chopping housing or drum in which there is disposed a rotatable cutter or chopper head peripherally carrying a plurality of elongated adjustable cutting edges or knives for cutting, chopping or otherwise abscinding harvested forage crops. The axis of rotation of the rotatable cutter head is transverse to the general path of movement of the harvesting device, and the cutting edges are disposed parallel to the axis of rotation of the rotatable head.

The housing or drum in which the rotatable cutter head is disposed generally extends the width of its forage harvester body. An aperture or opening is provided in an upper end portion of the cutter head housing through which a conventional knife or edge sharpening tool is adapted to be projected into sharpening engagement with and drawn longitudinally of the cutting edge to sharpen the same.

To the end that each cutting edge will be sharpened uniformly, a sharpening or honing stone is conventionally carried in a tool or holder which is mounted on a pair of rails intended to be parallel and along which the tool is guided and drawn. However, as a result of normal variation within the limits of customary manufacturing tolerance, frequently the rails along which a stone carrying tool is drawn are not adequately parallel or aligned. Accordingly, treated edges may not be uniformly sharpened along their lengths. Traversing action of stone holder may be impaired by operating on non-parallel shafts (rails).

While prior devices provide for adjustment of a sharpening stone through adjustment of one of the rails on which its tool is supported, they do not successfully produce uniform fine adjustments for a sharpening stone of the character available when the adjustment force is applied directly on the stone carrying tool itself rather than on the tool support. By employing prior adjusting means, when adjustment of a stone is required, the position of the rail, along which the stone carrying tool is slid in a traverse longitudinally of a cutting edge, is altered. Thereby, not only the position of the sharpening stone is altered but also the course it traverses.

Certain prior devices rely upon rotation of one rail about the center line of the other. Some of these devices apply adjusting force directly to stone carrying tool itself. They do not, however, make provision for definitely adjusting the relative position of the rails with respect to each other, or for means to allow such adjustment.

By making provision for adjusting the rails, tool and stone independently of each other, that is to say, by having means for adjustment of the stone and its tool regardless of the position of their rails, truer adjustments can be procured to maximize uniformity of sharpening cut along the length of each knife or cutting edge treated.

In accordance with the instant invention, and as an object thereof, there is provided an improved knife sharpening device.

A further object of the instant invention is the provision of an improved knife sharpening device of the class described having means for adjusting the disposition of a first guide rail from either end, whereby the path which the tool or holder for a sharpening stone traverses is adjustable relative to another guide rail and the cutting edge of a knife to be sharpened, whereby to provide a simple compensating adjustment to counteract any inherent non-parallelism which may exist due to manufacturing tolerances. Also, certain rails are actually adjustable and actually, a single shaft or rail may be adjusted in a single direction to compensate for variations in alignment in any direction.

A yet further object of the instant invention is the provision in a knife sharpener of the class described of novel means for adjusting the position of the sharpening or honing stone independently of the rails defining a path for the holder or tool in which said stone is mounted.

A still further object of the instant invention is the provision in a knife sharpener of an improved sharpening stone adjustment means.

An additional object of the instant invention is the provision in a knife sharpener of means for indexed adjustment of a sharpening stone.

A further object of the invention is to provide a knife sharpener in which the parts are so designed and arranged as to be self-compensating irrespective of the non-parallelism of the traverse bars upon which the sharpening honing stone is mounted for movement axially of the cutter head whereby the honing stone will obtain engagement with the blades of the cutter throughout the entire axial extent of the blades.

It is an object of one embodiment of the invention to provide a spring-bail loading device such that the force exerted on the adjusting bolt (and consequently on the stone holder) by the spring bail remains constant throughout the span of adjustment.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 5 is a vertical sectional view taken substantially along the line 5—5 of FIG. 2 and looking in the direction of the arrows, a non-sharpening position of parts shown in dotted lines.

FIG. 6 is a plan view taken substantially along the line 6—6 of FIG. 5 and looking in the direction of the arrows;

FIG. 7 is a side elevation of a modified embodiment of the invention, parts being broken away and parts being shown in solid line for the purpose of illustration.

Referring first particularly to FIGS. 1–6, inclusive, of the drawings, the drum or cutter head housing 10 of a forage harvester is disclosed as comprising a pair of opposite side walls 11 and 12 which are disposed substantially parallel to each other and have journalled therein or rotatably projected therethrough a cutter head shaft (not shown) which supports a cutter head 13, only a portion of which is shown in FIG. 5. The cutter head 13 is adapted to rotate in the direction of arrow 14 seen in FIG. 5 to generate a cylinder about its longitudinal axis which extends transversely of the walls 11 and 12 between which said cutter head is mounted.

Figure 1:
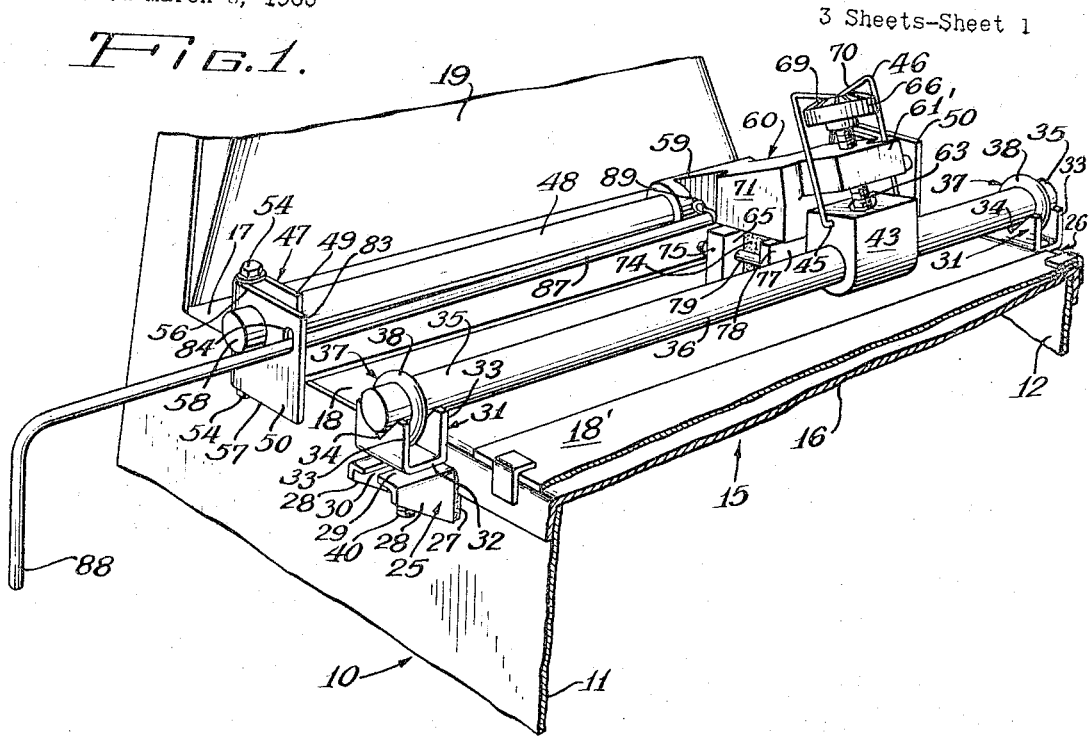
FIG. 1 is a perspective view of one embodiment of the instant invention.
Figure 2:
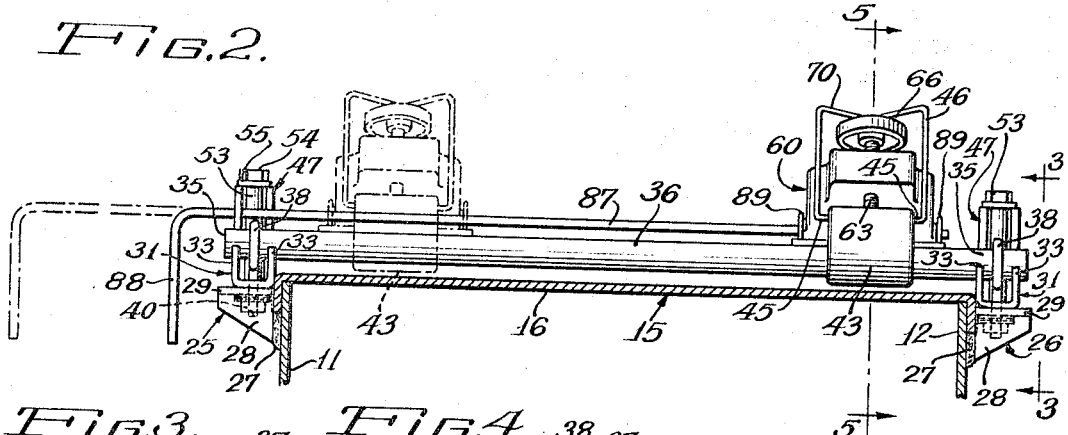
FIG. 2 is an elevational view looking toward what might be considered the front of said embodiment, an adjusted position being shown in dotted lines.

The housing 10 has a top cover 15 which closes the drum 10 from above, as illustrated in FIGS. 1, 2 and 5. Said cover comprises a pair of sections 16 and 17 which are spaced apart from each other to provide therebetween a slot 18 which extends transversely of the drum 10 and into which access is available from above through said slot 18 normally closed by cover plate 18'.

A conventional discharge chute 19 is disposed at the rear of the cutter drum 10 and into which processed crop is delivered for discharge from the harvester in the conventional fashion well known to those in the art.

The cutter head 13 carries or has rigidly secured on opposite end portions thereof a plurality of brackets 20, only one of which is seen in FIG. 5, and which is shown as secured to said cutter head 13 by means of suitable fasteners 21. The brackets 20 are arranged in opposed pairs, with each pair comprising a knife holder disposed transversely of the drum 10, with each knife holder spaced from an adjacent thereof peripherally of the cutter head 13. Each pair of brackets 20 comprising a knife holder supports in cutting disposition an elongated knife or blade 22 which extends transversely of drum walls 11 and 12.

Each blade or knife 22 is adjustably secured in its holder by means including a releasable fastener 23, as illustrated in FIG. 5. Each knife or blade 22 has an elongated transversely extending cutting edge 24 which is carried into repeated contact with a stationary cutter (not shown) which is conventional in the art, between which and the edges 24 crop is chopped, cut or otherwise abscinded. After repeated uses of the cutting edge 24, sharpening thereof is required, and, to that end, the parts are arranged to provide access for a honing tool through the slot 18 into the chamber of the drum 10 just skirting or within the path of the edge 24, whereby the blade 22 may be sharpened, as illustrated in FIG. 5.

The invention is characterized by a stand, base or support comprising a pair of substantially like spaced apart brackets 25 and 26 which are rigidly secured to the outer surfaces of drum walls 11 and 12, respectively, by means which may be welded or the like, as illustrated at 27 in FIGS. 1 and 2. Each of the brackets 25 and 26 may be characterized by a pair of depending arms or portions 28 which extend downwardly at substantially right angles from a slotted upper bracket flat 29 having an outwardly opening slot 30, as clearly illustrated in FIG. 1. The flats 29 are calculated for disposition in a plane parallel to the edges 24 to the knives 22 for mechanical reasons which will be more readily apparent hereinafter.

Each of the stands 25 and 26 supports or carries a vertically adjustable rail mounting member 31, which, together with the other thereof, provide a rail support transversely of the cutter head drum 10. Each rail mounting member 31 is a bracket which is substantially U-shaped in cross section and has a substantially flat apertured base 32 which is disposed above its respective flat 29. Each rail supporting member 31 also comprises a pair of spaced apart substantially parallel arms 33 which are disposed transversely of the depending arms 28. Each of the arms 33 has a V-shaped slot 34 disposed above cover section 16, whereby four thereof are provided in transverse alignment to support the opposite end portions 35 of a transversely extending rail or shaft 36 which preferably is circular in cross section.

Figure 3:
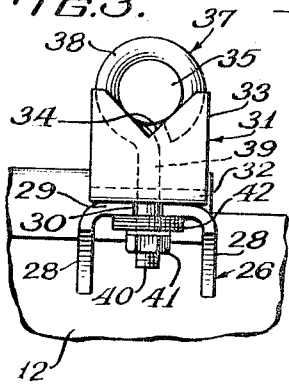
FIG. 3 is an end elevation of one of the adjustable rail mounting brackets taken along the line 3—3 of FIG. 2 and looking in the direction of the arrows.
Figure 4:
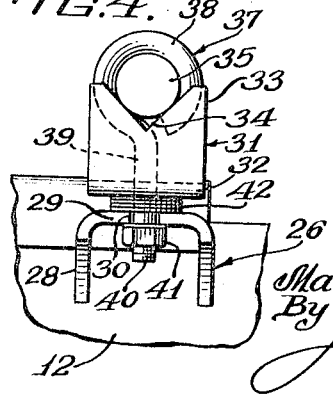
FIG. 4 is an elevational view similar to FIG. 3, showing the adjustable rail in a position adjusted from that shown in FIG. 3.

A vertically adjustable anchor or fastener 37 comprising an eye 38 which is disposed between the upwardly extending arms 33 of each mounting member 31 has projected therethrough a respective end portion 35 of said rail or shaft 36. Each fastener 37 has a depending portion or stem 39 extending downwardly from its eye 38 through the aperture in its respective base 32 through its aperture 30 below which its threaded end portion 40 is projected. A nut 41 is adjustably mounted on each threaded stem 39, as illustrated in FIGS. 2, 3 and 4.

As clearly illustrated in FIGS. 3 and 4, a plurality of thin washers, shims or spacers 42 are removably disposed about each stem 39, and one or more of said shims 42 is adapted to be mounted either above or below a respective flat 29 with its associated nut 41 drawn up tightly on the threaded end 40. Those shims that are disposed above flat 29 will be mounted between such flat and associated base 32, whereby its rail mounting member 31 will be elevated from an associated flat 29, as illustrated in FIG. 4. Those shims which are disposed below that flat 29 will be merely stored, as they do not function as spacers, and the associated rail mounting member 31 will be disposed at its lowest possible level with its base 32 engaging a respective flat 29, as illustrated in FIG. 3. It is appreciated that after the proper level of each rail end 35 is procured the nuts 41 on opposite sides of the drum 10 will be rotated to pull stems 40 downwardly and draw rail end portions 35 in intimate engagement with the sides of the slots 34, as illustrated in FIGS. 1, 3 and 4.

From the foregoing it is apparent that the inclination of the rail 36 may be adjusted upwardly or downwardly from either of its end portions 35 to selectively adjust the incline of shaft 36 above cover section 16.

What may be referred to as a slider 43, which comprises an apertured block slidable mounted longitudinally of the rail 36, has an upwardly opening pocket, well or seat 44 defined by tapered side walls, as illustrated in FIG. 5. In addition to being slidable longitudinally of the shaft 36, as illustrated in dotted lines in FIG. 2, the slider or block 43 is also rockable about said shaft or rail 36, as illustrated in dotted lines in FIG. 5. In the opposite sides thereof, said slider has rockably secured the opposite end portions 45 of a bail spring 46 which is illustrated in knife-sharpening position in FIGS. 1, 2, 5 and 6, and in FIG. 5 rotated to inoperative position as shown in dotted lines.

A second shaft or rail support, which comprises a pair of opposed rail holders 47 which are spaced transversely of the cutter head drum 10, provides the means for securing a shaft or rail 48 transversely of the cutter head drum 10 substantially parallel to the shaft or rail 36. Each of the rail holders 47 comprises a bent bracket which is J-shaped in horizontal section, having an inner short leg 49 and an outer longer leg 50. The inner legs 49 are secured to the outside surfaces of the drum walls 11 and 12, respectively, by means such as welding and the like to support the rail or shaft 48 above the cover section 17.

The legs 49 and 50 of each rail holder 47 are provided with transversely aligned apertures opening to the rear by a slot or slit 51 which extends through the curved portion 52 of its rail holder 47. A bolt 53 extends vertically between the legs 49 and 50 of each rail holder 47 adjacent the curved portion 52 thereof, as illustrated in FIGS. 2 and 5. By means of nuts 54 mounted on the opposite ends of each bolt 53, a pair of washers 55 are urged against opposite top and bottom portions 56 and 57 of each rail holder 47 to impinge therein a respective end portion 58 of rail or shaft 48.

The back end portion 59 of a stone holder or tool generally designated as 60 has a bushing lined aperture 61 whereby the stone holder 60 may be slid longitudinally of the rail 48 between the dotted line and solid line positions illustrated in FIG. 2, or it may be rocked about the axis provided by said shaft rail 48 between the dotted and solid line positions illustrated in FIG. 5.

A forward end portion 61' of said stone holder 60 has a threaded aperture 62 extending therethrough from its normal top to bottom. A screw 63 is threaded in said aperture which is aligned in a manner that directs the inner end portion 64 of said screw 63 into bearing engagement with slider 43 in the pocket 44 when the stone holder 60 and the slider 43 are disposed in knife-sharpening position. Accordingly, by rotating the screw 63, a torque will be applied on the end portion 61' which will cause the stone holder to rock about shaft 48 either upwardly or downwardly with respect to FIG. 5, according to the direction of screw rotation.

To the end that adjustment of the rocking movement of the stone holder 60 is not haphazard, precision control thereof may be provided by a manually adjustable cap 66 which is journalled on the upper end portion 67 of the screw 63. The cap may be secured in selected positions of rotation relative to the screw 63 by means of a set screw which releasably bears in a recess 68 in the upper end portion 67, as illustrated in FIG. 5. By providing the upper surface of the cap 66 with radial notches 69, which are clearly seen in FIG. 6, the screw 63 may be temporarily locked at any selected increment of lineal adjustment with respect to a previous position by engagement of the spring portion 70 of the bail 46 in a correspond recess 69.

A medial portion 71 of the stone holder 60 has a pocket or cavity 72 with an opening or mouth 73 which faces normally downwardly when the holder 60 is in stone-sharpening position, as illustrated in the solid lines of FIG. 5. An abrasive stone 74 for sharpening the cutting edges 24 is adjustably projected forwardly from the cavity 72 through the mouth 73, being adjustably secured inwardly and outwardly of pocket 72 against a downwardly projecting lip 75 integral with the fabric of the medial portion 71 and defining the mouth 73, as illustrated in FIGS. 1 and 5. Thereby, the grinding or honing edge 76 of said stone 74 may be grossly adjusted, the fine adjustments being achieved by adjusting the rail 36 in the manner heretofore described and by adjustment of the relative degree of rotation of the stone holder 60 through employment of the screw 63, in the manner heretofore described.

To secure the stone 74 in adjusted positions with respect to the stone holder 60, a clamp or plate 77 which has a pair of opposite overhanging portions 78, only one of which is clearly seen in FIG. 1, has projected therethrough, respectively, a pair of bolts 79. The heads 80 of said bolts 79 bear against the opposite forward faces of the clamp overhang portions 78, respectively. The opposite threaded end portions 81 of said bolts extend through opposite side portions 65 of the lip 75 and have threaded thereon nuts 82, respectively, which when tightened impinge the stone 74 between the facing portions of the clamp 77 and the lip 75, as illustrated in FIGS. 1 and 5.

One of the outer legs 50, in this embodiment being the leg shown to the left in FIG. 1, has a portion 83 which extends forwardly of its associated leg 49. The leg portion 83 has an aperture 84 which is disposed above the housing cover section 17 in horizontal alignment with an aperture 85 which extends transversely through a medial stone holder section 86 which is disposed between stone holder portion 71 and the rear holder portion 59. An elongated rod 87 having an outer handle 88 is extendable through the apertures 84 and 85 when the stone cutter is in operative position. A pair of releasable fasteners 89, which may be of any conventional or suitable design, releasably secure the stone holder 60 to the rod 87. Only one of said fasteners 89 is evident in the drawings in FIG. 1; however, one of each is disposed on each side of the stone holder 60. Thereby, when the rod 87 is manually moved from side to side through the aperture 84 from the solid line position of FIG. 2 to the dotted line position, and back again, the stone holder 60 will be slid longitudinally of the shaft or rail 48 if fasteners 89 are secure. It is observed that the diameter of the aperture 84 is larger than the diameter of the rod 87, in order to accommodate rocking adjustment of the stone holder 60. Furthermore, adjustment of the stone holder 60 is limited to the height of the aperture 84. The connection between the rod 87 and holder 60 may be of any conventional design such as a threaded connection whereby the rod 87 may be unscrewed to remove and threaded into the block 60 to connect with it.

Having thus described the details of construction of the embodiment illustrated in FIGS. 1, 2, 3, 4, 5 and 6, the manner of the operation of the device will be recapitulated. The stone holder 60 is guided transversely of the cutter drum 10, that is, longitudinally of the longitudinal axes of the knives 22 by reason of its mounting on the rails 36 and 48. A rod 87 which is releasably connectable to the stone holder 60 is used to push and pull the stone holder 60 through its honing or knife-grinding traverses. The rail or shaft 48 may be considered a fixed shaft, while the rail or shaft 36 is adjustable. The adjustment is by reason of elevation of the shaft 36 from the cover 15, which elevation can be uniform or inclined in either direction by reason of translocation of one or more of the shims 42 to adjustably spaced the bases 32 from the flats 29. Furthermore, the shaft 36 may be slightly adjustable in a horizontal plane by reason of a moderate rockability about vertical axes of the opposed rail mounting members 31. By reason of the foregoing, the rails 48 and 36 can be adjusted relatively to each other and to the cutting edges 24, to place the stone in working position, whereby upon honing or grinding of the cutting edges 24 uniform results will be obtained longitudinally of each edge 24 to improve performance and increase knife life.

Gross adjustments of the stone 74 into the path of the rotating blades is obtained by releasing the clamp plate 77 to set the stone 74 as desired and then re-securing the clamp to impinge the stone against the lip 75. Fine adjustment of the stone 74 to bring it into desired sharpening contact with edges 24 is achieved by reason of rotation of the screw 63 to elevate and lower the holder 60 by rocking it about the axis provided by the rail 48. Furthermore, the stone holder is biased with a substantially constant force throughout its limits of adjustment.

The spring bail 46 which is provided serves multiple purposes including (1) locking the stone holder 60 into operating position against slider 43, (2) providing for deflection caused by shock loading, and (3) in conjunction with the series of radial notches 69 in the top of the adjusting knob or handle 66, providing for indexing the rotation of the adjusting screw 63 to produce uniform increments of stone adjustment as well as temporarily locking said stone 74 in fixed position between adjustments. It will be understood that the construction of the bail spring is such that it exerts substantially non-varying force on the stone holder regardless of the position of adjustment. Furthermore, setting the range of each adjustment increment is achieved by rotating independently of the screw 63 its cap or the knob 66. In practice, however, the screw and knob are pinned together and the aforesaid adjustment although available is rarely used. In addition, if shaft 36, 48 are slightly out of parallel, the rounded bottom or ball end 90 which rides in a complementary cavity 91 in block 43 the cavity 91 inducing of flowing upwardly, permits the holder 60 to follow shaft 48 causing the stone to rock axially and/or circumferentially of the cutter while engaging the stone with the blades, the stone developing a convex abrading surface. However, any motion which would tend to produce a convex abrading surface is sufficiently small to be overridden by the concave abrading surface caused by the cylindrical nature of the periphery of the cutter head. Abrading surface is therefore essentially concave.

When the device is not in use, the bail 46 can be moved to the position illustrated in dotted lines in FIG. 5. To also move stone holder 60 to the dotted line position of FIG. 5, fasteners 89 require release and rod 87 must be withdrawn. Then cover 18' is fastened across slot 18.

A modified form of the invention is illustrated in FIG. 7. In that form of the invention, both shafts or rails 48 and 36 are mounted on the same side of the slot 18. That is to say, in the embodiment illustrated in FIG. 7, both rails are disposed to the rear of the slot 18. While the brackets 147 which support opposite end portions of the shaft 48 are of slightly different design from the J-shaped rail support members shown in the embodiment illustrated in FIGS. 1-6, inclusive, they perform substantially the same fixed rail supporting function.

Insofar as the brackets 131 support the opposite end portions of the rail 36 in adjusted positions, they function substantially the same as the adjustable rail mounting members 31. However, the brackets 131 are provided with an extension 132 through which a manually operable rod 187 having a handle 188 extends transversely of the housing 10. The rod 187 has a lug 133 which is secured to the block or slider 143 which is mounted for slidable movement longitudinally of the shaft or rail 36.

The slider 143 of the modified embodiment corresponds to slider 43 of the embodiment first described. Slider 143 is operably connectable to a stone holder or tool 160, the rear end portion 159 of which is mounted for sliding movement longitudinally of the shaft or rail 48 and rocking movement in a vertical plane about the axis provided by the shaft 48. The connection between the slider 143 and the stone holder 160 is achieved by means of a threaded pin 163 whose lower end portion 164 is pinned to boss 144 to allow relative angular motion between the pin 163 and the slider block 143 (see FIG. 7). Boss 144 is slotted and cross drilled for the pin 163. Boss 144 is integral with the slider 143. The screw-like member 163 extends outwardly from the boss 144 and an outer threaded end portion 167 thereof is projected through a medial portion 161 of the stone holder 160.

A compression spring 162 is mounted about the threaded pin 163 and the boss 144 with its lower end portion 166 bearing against the normally upper surface of the slider 143 and its upper end portion 165 engaging against a bearing surface provided therefor about an upwardly or outwardly opening pocket 168 provided in the medial portion 161 of stone holder 160. A nut 169 is threadedly mounted on the outwardly projected threaded pin end portion 167. It is provided with a handle 170 by which it can be rotated. The nut 169 has a rounded boss or lug 171 which is directed toward the pocket 168 into which said boss 171 is adapted to be advanced to rock the stone holder 160 clockwise about shaft 48 with respect to FIG. 7 to advance stone 74 into the housing 10 against the action of the spring 162. Upon release of the nut 169, that is, rotation thereof to thread it upwardly in FIG. 7, the compression spring 162 will cause elevation of the stone 74 as it rocks the stone holder 160 toward said withdrawing nut 169.

In the embodiment of the invention illustrated in FIG. 7, the stone 74 is mounted in an outer or forward end portion 191 of the stone holder 160. In sharpening position, the forward end portion 191 is disposed forwardly of the rails 36 and 48, and is disposed above the opening 18. In the forward end portion 191, there is provided a downwardly opening cavity 192 having a downwardly opening mouth 173 through which there is projected into the housing member 10 the cutting edge 76 of the stone 74.

The stone 74 is adjustably secured in the cavity 192 by being releasably clamped against its roof 175 by a slidable clamping plate 177 which is disposed rearwardly of the roof 175 in the manner illustrated in FIG. 7. The clamp or plate 177 is releasably secured in clamping position against the stone 74 by means including a bolt 179 the head 180 of which releasably bears against the plate or clamp 177. Said head 180 is drawn into releasable securance against clamp 177 by a nut 182 mounted on the threaded end portion 181 of said bolt which is extended through a suitable portion of the stone holder 160 and against which said nut releasably bears, as illustrated in FIG. 7.

With respect to the modified embodiment of the invention illustrated in FIG. 7, gross adjustment of the stone may be achieved by releasing the plate 177. Thereafter, fine adjustment is accomplished by advancing or withdrawing the nut 169 along the threaded end portion 167 to respectively urge the stone holder 160 clockwise with respect to FIG. 7 against the action of the spring 162 or counterclockwise under the action of said spring 162.

The shaft or rail 48 may be considered a fixed shaft, and no adjustment will ordinarily be required. The shaft or rail 36 in the modified embodiment is adjustable in the manner designated for adjustment in connection with said shaft in FIGS. 1–6.

In the modified embodiment, spring 162 is employed to remove any possible lash from the connection between the slider in the stone holder as well as to keep the stone holder 160 from dropping into the housing 10.

Furthermore, the ball and socket rockable engagement at 171, 168 permits the stone, that is holder 160 to move on the line of the shaft 48 while rocking the stone 74.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. A knife sharpening device and the like comprising a pair of elongated rails disposed substantially parallel to each other; rail support means for adjusting one of said rails from opposed positions into parallelism in the same plane with the other of said rails; a slider mounted on one of said rails; a sharpening stone holder having an end portion rockably and slidably mounted on the other of said rails and having stone gripper means for releasably securing a stone in adjusted positions; linkage means for releasably connecting said stone holder and slider and rockably adjusting the elevation of said stone gripper means, and means for drawing the stone holder in slider connected position longitudinally of said rails.

2. The device defined in claim 1 in which the rail support means comprises a pair of opposed brackets, one of said rails having a pair of opposed end portions mounted in said brackets, respectively, each of said brackets comprising means for elevating and rocking about a vertical axis a respective of said end portions.

3. The device defined in claim 1 in which the rail support means comprises a pair of fixed stands mounted in opposite positions; a bracket disposed above each stand, one of said rails having opposed end portions seated in said brackets; a spacer replaceably secured between each bracket and a respective stand, and anchoring means for securing said opposed end portions to respective of said brackets and said brackets to respective of said stands.

4. The device defined in claim 3 in which said anchoring means comprise a pin extending through each stand and an associated bracket and having a threaded end portion and an eye carrying end portion, each bracket adjustable rockably about and vertically longitudinally of its pin, each of said end portions mounted in a respective eye, and a take-up nut mounted on each threaded end portion to releasably pull said end portions against their brackets, respectively.

5. The device defined in claim 4 in which each bracket comprises a pair of upwardly extending legs, said legs having a pair of V-shaped slots aligned axially of one of said rails and providing a seat for one of said end portions.

6. A knife sharpening device and the like comprising a first and a second elongated rail mounted in substantial parallelism; a sharpening stone holder having an anchored end portion pivotably mounted on said first rail and slidable longtitudinally thereof; a slider mounted on said second rail and slidable longitudinally thereof, said stone holder having a releasably securable end portion opposite said anchored end portion, said stone holder having stone gripper means for releasably securing a sharpening stone medially of the end portions of said stone holder; linkage means for releasably connecting the releasably securable end portion of said stone holder and said slider and for adjusting the elevation of said stone gripper means, and means for drawing the stone holder and connected slider longitudinally of said rails.

7. The device defined in claim 6 in which the linkage means comprises an adjusting screw threaded through the releasably securable end portion of said stone holder and having a lower end bearing against said slider and a releasable clamp carried on said slider and releasably connecting said slider and said screw.

8. The device defined in claim 6 in which the linkage means comprises an adjusting screw threaded through the releasably securable end portion of said stone holder and having a lower end releasably bearing against said slider, and a spring bail having opposite end portions pivotally connected to said slider, said screw having an upper end portion releasably engageable by said spring bail to releasably connect the stone holder and the slider.

9. The device defined in claim 6 in which the linkage means comprises an adjusting screw threaded through the releasably securable end portion of said stone holder and having a bearing lower end releasably engageable with said slider and an upper end portion having indexed slots, and a spring bail rockable about said screw and having opposite lower end portions pivotally connected to said slider, said spring bail having an upper spring component releasably securable in said indexed slots, respectively, whereby adjustment of said stone holder can be made in indexed increments.

10. A knife sharpening device and the like comprising a first and a second elongated rail mounted in substantial parallelism; a sharpening stone holder having an anchored end portion pivotably mounted on said first rail and slidable longitudinally thereof; a slider mounted on said second rail and slidable longitudinally thereof, said stone holder having a stone gripper end portion opposite said anchored end portion and defining stone gripper means for releasably securing a sharpening stone; linkage means disposed medially of the end portions of said stone holder for releasable connection thereof to said slider and adjusting the elevation of said stone gripper, and means for drawing the stone holder and connected slider longitudinally of said rails.

11. The device defined in claim 10 in which the linkage means comprises a pin having a first end portion connected to said slider and an opposite threaded end portion projected through said stone holder; an adjusting nut threaded on said threaded end portion, and a spring bearing against said slider and stone holder and urging said stone holder against said nut.

12. The device defined in claim 10 in which the linkage means comprises a pin having a lower end portion adjustably secured to said slider and an upper threaded end portion projected upwardly through said stone holder, said stone holder having an upper and a lower surface; a compression spring disposed about said pin and having opposite end portions bearing against said slider and the lower surface of said stone holder, respectively, and an adjusting nut mounted on the threaded end portion of said pin and adjustably bearing against the upper surface of the stone holder against the action of said spring.

13. A knife sharpening device and the like comprising a pair of elongated rails; means for adjusting one of said rails from opposed positions into parallelism with the other of said rails; a slider mounted on one of said rails; a sharpening stone holder having an end portion rockably and slidably mounted on the other of said rails and having stone gripper means for releasably securing a stone in adjusted positions; a pin link having a lower end portion adjustably bearing against said slider and an upper end portion projected through said stone holder; means on the upper end portion of said pin link for adjustably securing said stone holder longitudinally of said pin link to thereby adjust the elevation of said stone, and means for drawing the stone holder in connected position with said slider longitudinally of said rails.

14. The device defined in claim 13 in which the means for adjustably securing said stone holder longitudinally of the pin link comprises a spring disposed about said pin link.

15. The device defined in claim 6 in which the linkage means comprises an adjusting screw threaded through the releasably securable end portion and having an upper end portion and a lower bearing end portion in releasable engagement with said slider; a cap journalled on said upper end portion and having radial indexing slots; means for securing said cap in adjusted positions of rotation on said screw; a spring bail rockable about said screw and having lower end portions pivoted on said slider, said spring bail having a transverse upper spring component releasably securable in said indexed slots, respectively, whereby said holder is releasably secured at selected increments of adjustment.

16. A knife sharpening device for a cylindrical cutter having peripheral blades with sharpened edges, said device comprising a pair of rails disposed generally parallel to the axis of the cutter and to each other, stone holder means bridging said rails and including a part slidable on each rail longitudinally thereof, an articulated connection between the parts accommodating universal angular movements therebetween, and a stone mounted on one of said parts for movement therewith while in engagement with said edges of the blades.

17. The invention according to claim 16 and yieldable means in the connection between the parts biasing the same into engaging position of the stone with the edges of the blades.

18. The invention according to claim 16 and said connection comprising a ball and socket.

19. The invention according to claim 16 and yieldable means in the connection, and said connection being adjustable, and said yieldable means exerting a substantially constant load during all increments of adjustment of the connection.

20. The invention according to claim 19 and said yieldable means comprising a bail spring having a pair of legs pivotally connected to one of the parts and having a V-shaped bight portion interconnecting the legs, and said connection including an adjusting screw threaded in the other part and reacting against the one part, and said bight portion engaging the screw.

(References on following page)

References Cited

UNITED STATES PATENTS

| | | | |
|---|---|---|---|
| 11,244 | 9/1898 | Leshure | 56—250 |
| 1,303,249 | 5/1919 | Brown | 248—74 XR |
| 2,005,551 | 6/1935 | MacDonald | 51—246 |
| 2,121,965 | 6/1938 | Himebaugh | 51—246 |
| 2,928,215 | 3/1960 | McDonald | 51—173 |
| 2,931,853 | 4/1960 | Wilson | 248—74 |

ROBERT C. RIORDON, *Primary Examiner.*

J. A. MATHEWS, *Assistant Examiner.*